Figure 1:
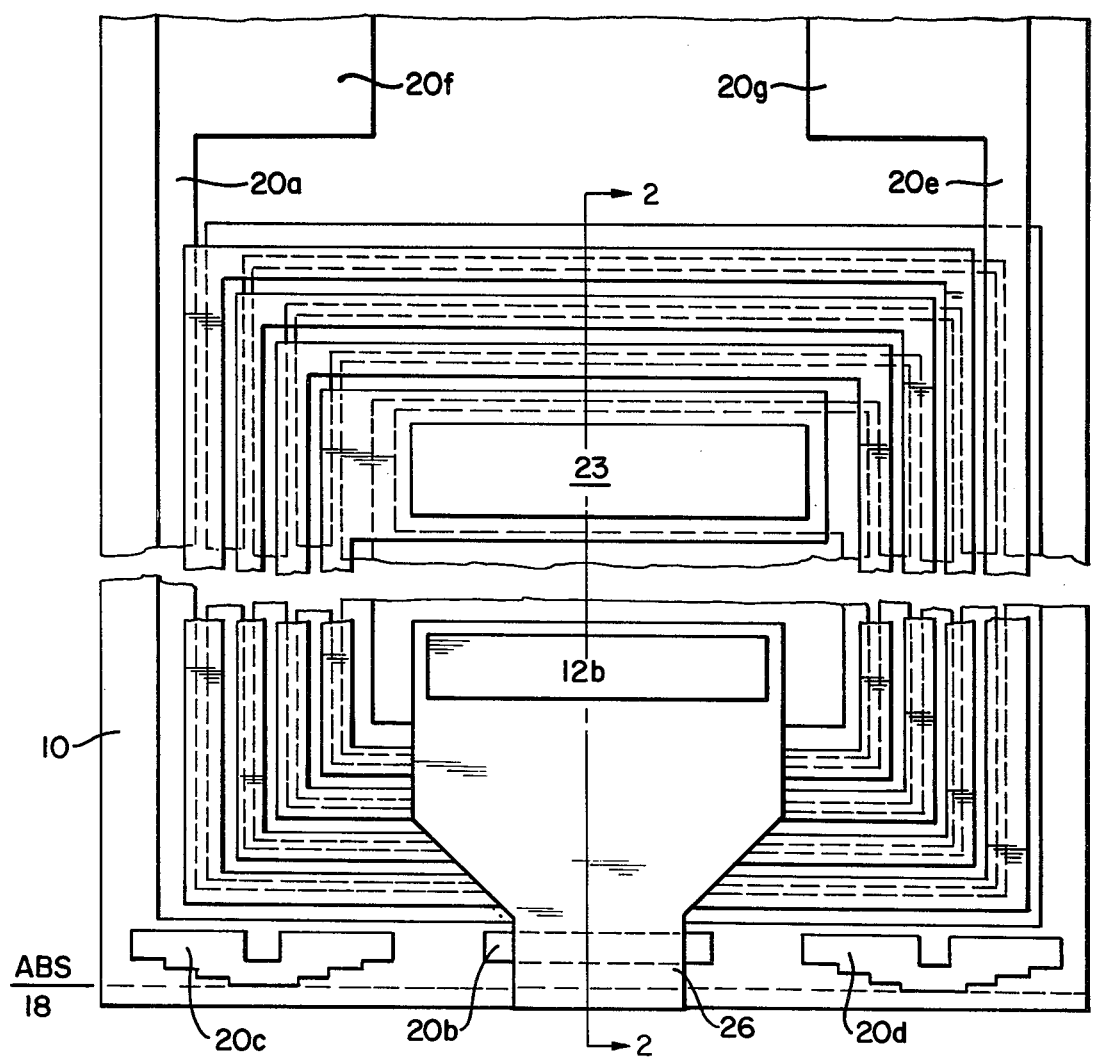

United States Patent [19]

Katz

[11] Patent Number: 4,458,279
[45] Date of Patent: Jul. 3, 1984

[54] THIN FILM TRANSDUCER AND METHOD OF MAKING SAME

[75] Inventor: Eric R. Katz, San Jose, Calif.

[73] Assignee: Magnex Corporation, San Jose, Calif.

[21] Appl. No.: 246,748

[22] Filed: Mar. 23, 1981

[51] Int. Cl.³ .......................... G11B 5/20; G11B 5/12; G11B 5/22; G11B 5/27

[52] U.S. Cl. .................................... 360/123; 360/113; 360/121; 360/122

[58] Field of Search ....................... 360/123, 119–122, 360/124, 125, 126, 127; 83/425.7, 442; 235/492, 493, 494, 459

[56] References Cited

U.S. PATENT DOCUMENTS

| | | |
|---|---|---|
| Re. 29,326 | 7/1977 | Lazzari et al. . |
| 3,821,815 | 6/1974 | Abbott et al. . |
| 3,846,841 | 11/1974 | Lazzari et al. . |
| 3,908,194 | 9/1975 | Romankiw . |
| 4,092,688 | 5/1978 | Nomura et al. . |
| 4,143,458 | 3/1979 | Gibson . |
| 4,190,872 | 2/1980 | Jones, Jr. et al. . |
| 4,195,323 | 3/1980 | Lee . |
| 4,241,367 | 12/1980 | Nomura ............................ 360/123 |

OTHER PUBLICATIONS

"Finite Element Analysis of the Vertical Multi-Turn Thin-Film Head", IEEE Transactions on Magnetics, vol. 14, No. 5, Sep. 1978, pp. 506–508, by Eric R. Katz.
IBM Technical Disclosure Bulletin, vol. 13, No. 3, Aug. 1970, pp. 787–788, "Measuring Throat Gap Height of a Magnetic Head", by G. B. Flippen.

Primary Examiner—Robert Martin Kilgore
Attorney, Agent, or Firm—Townsend and Townsend

[57] ABSTRACT

Optically or visually perceptible lapping and grinding patterns are provided in a thin film transducer structure by depositing conductive material both between the magnetic pole pieces and, external to such pole pieces. The conductive material between the pole pieces is so positioned as to determine the zero throat point of the transducer and is in predetermined aligned relationship with the external pattern by, for example, being formed during a single masking step.

13 Claims, 2 Drawing Figures

THIN FILM TRANSDUCER AND METHOD OF MAKING SAME

BACKGROUND OF THE INVENTION

This invention relates to thin film transducers for recording and reading magnetic discontinuities on a magnetic recording medium and, in particular, to improved structures for and methods of manufacturing such thin film transducers or heads.

One approach to the design of thin films heads is described in my paper "Finite Element Analysis of the Vertical Multi-turn Thin Film Head", IEEE Transactions on Magnetics, Volume 14, Number 5, Sept. 1978, pages 506–508. As is described in that paper, it is customary to provide a close spacing (for example, a gap of the order of one micrometer) between upper and lower magnetic pole pieces at the read/write transducing gap of a thin film head. It is also advantageous to limit the "throat height" of the transducing gap to a relatively short distance (of the order of less than ten micrometers).

The throat height of the head, which is defined as the distance from the pole tips to a point at which the two pole pieces begin to diverge from each other, normally is determined by grinding and lapping the pole tips to form an air bearing surface (ABS). The relatively small dimensions and tolerances associated with throat height require that precise indicies be provided for determining the location of the zero throat point or apex (the point at which the pole pieces diverge).

In the construction of earlier, physically larger, magnetic heads (see IBM Technical Disclosure Bulletin Volume 13, No. 3, Aug. 1970, pages 787–788, "Measuring Throat Gap Height of a Magnetic Head" by G. B. Flippen), it was possible to make use of a precise mechanical frame assembly and reference pins on a grinding fixture for indirectly locating the zero throat point, thereby controlling throat height. However, such techniques are not suitable for the extremely small dimensions encountered in thin film heads.

Where the small dimensions of thin film heads are involved, electrical resistance measurements of an active conductor pattern have been employed to determine the desired throat height (see U.S. Pat. No. 3,821,815 Abbott et al). The thickness of the conductor pattern had also been used to determine the gap length in that case. The gap length and the location of the zero throat point may also be determined by deposition of patterns of other materials. For example, one or more layers of insulating material (see U.S. Pat. No. 3,846,841 - Lazzari et al; U.S. Pat. No. 3,908,194 - Romankiw; U.S. Pat. No. 4,092,688 Nomura et. al; U.S. Pat. No. 4,190,872 Jones et al); one or more layers of conductive material (U.S. Pat. NO. 3,821,815 - Abbott et al noted above and U.S. Pat. No. 4,143,458 - Gibson) or combinations of insulating and conductive materials (U-S. reissue Pat. No. 29,326 - Lazzari et al) have been employed.

In at least some of the above-noted configurations (see U.S. Pat. No. 3,821,815 - Abbott et al and U.S. Pat. No. 4,092,688 - Nomura et al), the gap spacer material is electrically conductive and forms part of the energizing coil which extends between the pole pieces.

Despite the foregoing developments in the magnetic head arts, it has been found to be necessary to further improve the control of throat height and definition of the apex in the manufacture of thin film heads.

In accordance with one aspect of the present invention, a thin film magnetic transducer assembly comprises a substrate and a first magnetic pole piece disposed in a layered configuration relative to a surface of the substrate. At least one layer of electrically conductive material is disposed in a pattern which, in part, overlies the first magnetic pole piece. A second magnetic pole piece is disposed in a second layered configuration overlying the first pole piece and a portion of the electrically conductive material. The second pole piece is spaced from the first pole in a pole tip region to form a transducing gap of a first length and forms a back gap with the first pole piece in a back gap region. The pattern of conductive material includes first means adjacent the pole tip region for divergently spacing the first and second pole pieces apart by a distance greater than the transducing gap length in an apex region adjacent the pole tip region. The pattern also comprises second means outside the first and second pole pieces and having visible or optically detectable indicies in predetermined aligned relationship with the first means. The visible indicies extend at least to a target reference line in predetermined aligned relationship with the pole tip end of the pole pieces. The indicies are adapted for determining the location of the apex region relative to the desired pole tip ends.

These and other aspects of the present invention will be further described in the following specification in connection with the accompanying drawing.

IN THE DRAWING

Figure 2:
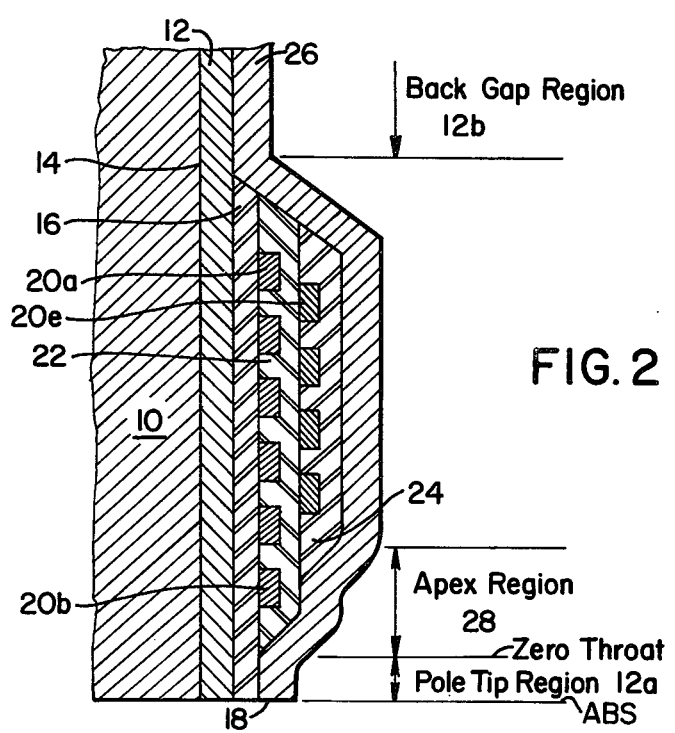

FIG. 1 is a top plan view of a portion of a thin film magnetic transducer assembly (not shown to scale) embodying the invention as it appears prior to final grinding and lapping; and FIG. 2 is a partial enlarged sectional view taken along the line 2—2 of the apparatus of FIG. 1 after final grinding and lapping.

Referring to the drawings, a thin film magnetic transducer embodying the invention comprises a substrate 10 of non-magnetic material which, for example, is formed of ceramic or silicon material. A first layer of magnetic film materil forming a first magnetic pole piece 12 is disposed on a surface 14 of substrate 10 and typically is of uniform thickness between at least a pole tip region 12a and a back gap region 12b. A first layer of non-magnetic insulating material 16 such as silicon dioxide is deposited over pole piece 12 and extends from pole tip region 12a to back gap region 12b.

A first layer of electrically conductive material, forming a conductive winding 20a, an apex spacer bar 20b and lapping targets 20c and 20d, is deposited in an appropriate pattern (see FIG. 1) over the layer of insulating material 16. Apex spacer bar 20 b is located with respect to a desired air bearing surface 18 of the finished head (see FIG. 2) to provide a desired throat height as will be explained more fully below.

A second layer of insulating material 22 of sufficient thickness to cover winding 20a is deposited over secret insulating layer 16. As illustrated, a second layer of electrically conductive material, forming a further conductive winding 20e, is deposited in a pattern over the layer of insulating material 22. It should be recognized that winding 20e is not essential to the invention and is used only where the characteristics of a particular device require it's presence from the standpoint of the desired electromagnetic operating characteristics. If used, second winding 20e is covered by a third insulating layer 24.

As is shown in FIG. 1, first conductive winding 20a terminates in an enlarged area (or pad) 20f to form a first electrical contact and second conductive winding 20e terminates in a similar enlarged area 20g which forms a second electrical contact. The two winding layers 20a and 20e are joined together by means of a contact area 23 (see FIG. 1).

A second layer of magnetic material forming a second magnetic pole piece 26 is deposited over first pole piece 12 in the back gap region 12b, over insulating layers 22 and 24 in the regions occupied by conductive windings 20a and 20e and over insulating layer 16 in pole tip region 12a.

As is shown in FIG. 1, in their unfinished state, the pole pieces 26 and 12 (the latter lying below pole piece 26) extend beyond the desired air bearing surface (ABS) 18.

According to an important feature of this invention, the conductive windings 20a and associated metallization pattern including apex spacer bar 20b and lapping patterns 20c and 20d are formed in accurate, predetermined, aligned relationship with respect to each other. Preferably, the patterns for spacer bar 20b and lapping patterns 20c and 20d are formed in a single masking operation, the details of such masking being well known in the thin film and semiconductor manufacturing arts. The apex spacer bar 20b consists of a metal bar which is not connected to the remainder of windings 20a and 20e but is of sufficient thickness (e.g. equal to that of the windings 20a and 20e) to result in a separation of pole pieces 12 and 26 in the apex region 28 which provides the desired operating characteristics of the device.

The lapping patterns 20c and 20d have visible or optically detectable or perceptible indicies (shown as steps in FIG. 2) which are in predetermined aligned relationship with respect to spacer bar 20b. The visible indicies extend at least to a target reference line (the ABS 18) which is in predetermined aligned relationship (i.e. coincident with) a desired end of pole pieces 12 and 26.

The transition point between the apex region 28 and the pole tip region 12a (see FIG. 2) is determined by the location of spacer bar 20b. In particular, the location of the edge of spacer bar 20b which is closest to ABS 18, in combination with the minimum desired thickness of insulating layer 22 determines the location of this transition or "zero throat" point.

As is illustrated in FIG. 2, the separation between pole pieces 12 and 26 at various locations relative to ABS 18 is determined by the thicknesses of the particular films deposited between such pole pieces 12 and 26. Specifically, in the illustrated embodiment, the transducer gap length in the pole tip region 12a is determined by the thickness of insulating layer 16 (typically one micron). The diverging separation of the pole pieces 12 and 26 in the apex region 28 is determined initially by the thickness of spacer bar 20b and insulating layer 22 and subsequently (i.e. further form ABS 18) by the additional thicknesses of conductor winding 20e and insulating layer 24. The dimensions of these several parts are relatively in proportion in the drawing.

In finishing the head structure, the entire structure shown in FIG. 1 is suitably mounted for grinding and lapping of the air bearing surface 18. The lapping procedure is continued until the desired portion of the lapping patterns 20c and 20d remains. Because of the fact that patterns 20c and 20d are formed of metal (e.g. aluminum), they are visible or optically detectable and therefore the progress of the grinding and lapping procedures is readily observable albeit under magnification. It should be noted that the conventional insulating material ($SiO_2$) is optically transparent and hence is not an appropriate material for such a lapping target or pattern.

The lapping may be continued until the material of substrate 10, pole pieces 12 and 26 and insulating layer 16 is removed up to the lowermost step on the lapping patterns 20c and 20d. Alternatively, the lowermost step of the lapping patterns 20c and 20d may be used as a guide for a transition between a coarse grinding operation and the finer lapping operation. In the latter case, the device is ground until the lowermost step is reached and then the lapping procedure is followed until the second (or a higher) step on patterns 20c and 20d is coincident with the lapped surface. This latter condition is also visually observable. In each case, the patterns 20c and 20d which are accurately located relative to spacer bar 20b (and therefore are accurately located relative to the zero throat point) are utilized as visible indicators to control the lapping process.

In the preferred arrangement according to the invention, the location of the material (i.e. the spacer bar 20b) which defines the position of the apex 28 and the lapping control patterns 20c and 20d are defined during the same fabrication step, thereby eliminating positioning inaccuracies associated with alignment of separate masks. The relative locations of these elements 20b, 20c and 20d are thus determined consistent with the very precise optical-photographic tolerances of the deposition mask.

The spacer bar 20b and lapping control patterns 20c, 20d can be included in the same mask and deposition step as one of the layers of the coil turns 20a, or the coil turn 20a can be deposited in a separate mask and deposition step. The first method is simpler, since it eliminates the need for a separate set of mask and deposition steps, and it also eliminates positioning inaccuracies between the spacer bar 20b and the windings 20a. The second method can be used if it is desired to make the spacer bar 20b thicker than the thickness of windings 20a. A further benefit of these methods is a steeper pole approach angle and better corner definition at the apex, since the edge of the metal which principally determines these characteristics can be controlled better than the insulator material which has been used previously (as shown for example in U.S. Pat. No. 4,190,872 noted above).

While the invention has been described in the context of a preferred embodiment, it should be recognized that various modifications may be made within the scope of the invention.

For example, a single lapping pattern 20c may be utilized. The shape of the lapping patterns 20c, 20d may take forms other than the stepped pattern illustrated (e.g. a number of adjacent stripes of different length). Moreover, the visible lapping patterns may be used in the finishing steps of the device in combination with electrical measurement of additional patterns (not shown) for determining a transition between rough grinding and final finishing steps.

The invention may also be used in connection with more complex head structures such as are described in U.S. Pat. No. 4,195,323 of Fred s. Lee, which patent is assigned to the same assignee as the present invention.

What is claimed is:

1. In a thin film magnetic transducer assembly of the type characterized by:
   a substrate;
   a first magnetic pole piece disposed in a first layered configuration relative to a surface of said substrate and having a first end in a pole tip region and a second end in a back gap region;
   at least one layer of electrically conductive material disposed in a pattern overlying said first magnetic pole piece; and
   a second magnetic pole piece disposed in a second layered configuration overlying at least a portion of said first pole piece and said electrically conductive material, said second pole piece being spaced from said first pole piece in said pole tip region to form a transducing gap of a first length and forming a back gap with said first pole piece in said back gap region; the improvement wherein: said pattern of said conductive material includes first means adjacent said pole tip region for divergently spacing said first and second pole pieces apart by a distance greater than said first length in an apex region adjacent said pole tip region, said first means determining a zero throat height transition region of said first and second pole pieces; and
   said pattern further comprises second means outside said first and second pole pieces having optically detectable indicies in predetermined aligned relationship with said first means, said optically detectable indicies extending at least to a target reference line in predetermined aligned relationship with said first end of said first pole piece, and being optically detectable for accurately determining the location of said apex region relative to said first end.

2. A thin film magnetic transducer assembly according to claim 1 wherein:
   said indicies include a plurality of graduated steps of conductive material, at least one of said steps being coincident with the location of a desired finished surface of said transducer.

3. A thin film magnetic transducer assembly according to claim 2 wherein:
   said first means for divergently spacing said first and second pole pieces apart comprises a bar of conductive material positioned between said pole pieces in said apex region and having a thickness selected for providing a desired divergence of said pole pieces in said apex region.

4. A thin film magnetic transducer assembly according to claim 3 and further comprising a layer of insulating material overlying said bar of conductive material and spacing said second magnetic pole piece from said conductive material.

5. A thin film magnetic transducer assembly according to claim 3 wherein said bar of conductive material extends between said magnetic pole pieces along a line substantially parallel to said target reference line.

6. A thin film magnetic transducer assembly according to claim 1 wherein said optically detectable indicies are disposed adjacent and on opposite sides of said pole pieces, and each of said indicies has a portion aligned in parallel relationship with the other of the indicies and with said target reference line.

7. A thin film magnetic transducer assembly according to claim 6 wherein said first means comprises a bar of conductive material positioned between said pole pieces in said apex region and extending substantially parallel to said optically detectable indicies and said target reference line.

8. A thin film magnetic transducer assembly according to claim 7 wherein said bar of conductive material has an edge aligned with a corresponding edge portion of said indicies.

9. A thin magnetic transducer assembly according to claim 7 wherein said bar and said optically detectable indicies are electrically unconnected.

10. A method of fabricating a thin film magnetic head having an accurately determined throat height comprising the steps of:
    depositing on a substrate in a layered configuration at least a first magnetic pole piece, a first layer of insulating material, a first layer of conductive material disposed in a pattern which, in part, overlies said first pole piece, a second layer of insulating material and a second magnetic pole piece overlying portions of said conductive material and said first pole piece, said pattern of conductive material including a first conductor segment lying between said first and second pole pieces adjacent a pole tip region thereof for spacing said pole pieces from each other to define an apex region, said pattern further including at least a second conductor segment outside said first and second pole pieces and having optically detectable indicies in predetermined aligned relationship with said first conductor segment; and
    removing material of said substrate, pole pieces, insulating material and conductive pattern while optically monitoring said indicies of said second conductor segment until a desired throat height, as indicated by said indicies, is obtained.

11. The method of claim 10 wherein said conductor pattern is photolithographically formed.

12. The method of claim 11 wherein said first and second segments are defined by a single photo-mask.

13. The method of claim 12 wherein said first and second segments are unconnected to each other.

* * * * *